US011967779B2

(12) United States Patent
Jiang et al.

(10) Patent No.: US 11,967,779 B2

(45) Date of Patent: Apr. 23, 2024

(54) SINGLE-FREQUENCY CIRCULAR POLARIZATION POSITIONING ANTENNA AND WEARABLE DEVICE

(71) Applicant: GUANGDONG GENIUS TECHNOLOGY CO., LTD., Dongguan (CN)

(72) Inventors: Qinghua Jiang, Dongguan (CN); Xiao Zhang, Dongguan (CN); Bo Mei, Dongguan (CN); Zengpei Zhong, Dongguan (CN); Qiyu Zeng, Dongguan (CN)

(73) Assignee: GUANGDONG GENIUS TECHNOLOGY CO., LTD., Dongguan (CN)

( * ) Notice: Subject to any disclaimer, the term of this patent is extended or adjusted under 35 U.S.C. 154(b) by 18 days.

(21) Appl. No.: 17/994,238

(22) Filed: Nov. 25, 2022

(65) Prior Publication Data

US 2023/0088069 A1 Mar. 23, 2023

Related U.S. Application Data

(63) Continuation of application No. PCT/CN2020/142292, filed on Dec. 31, 2020.

(30) Foreign Application Priority Data

May 28, 2020 (CN) ......................... 202010470797.7
May 28, 2020 (CN) ......................... 202020941597.0

(51) Int. Cl.
*H01Q 9/04* (2006.01)
*H01Q 5/49* (2015.01)

(52) U.S. Cl.
CPC ............ *H01Q 9/0428* (2013.01); *H01Q 5/49* (2015.01)

(58) Field of Classification Search
CPC .......... H01Q 1/32; H01Q 5/49; H01Q 9/0428; H01Q 9/42; H01Q 21/24
See application file for complete search history.

(56) References Cited

U.S. PATENT DOCUMENTS

| | | | |
|---|---|---|---|
| 9,397,405 | B2 | 7/2016 | Yanagi et al. |
| 2007/0285334 | A1 | 12/2007 | Tsutsumi et al. |

(Continued)

FOREIGN PATENT DOCUMENTS

| | | | |
|---|---|---|---|
| CN | 101414708 | A | 4/2009 |
| CN | 104659471 | A | 5/2015 |

(Continued)

OTHER PUBLICATIONS

First Office Action issued in counterpart Chinese Patent Application No. 202011637128.0, dated Nov. 16, 2022.

(Continued)

*Primary Examiner* — Hoang V Nguyen
(74) *Attorney, Agent, or Firm* — Westbridge IP LLC

(57) ABSTRACT

Disclosed are a single-frequency circular polarization positioning antenna and a wearable device. The single-frequency circular polarization positioning antenna includes an inverted F antenna and a parasitic antenna which are in an orthogonal layout; resonance is generated on the parasitic antenna through a coupling effect by means of feeding the inverted F antenna, so that the overall structure of the circular polarization antenna is simplified, and is achieved on a wearable product more easily. Therefore, the positioning antenna can better receive signals of a navigation satellite, and right hand circular polarization radiation generated by an annular radiating body can also filter left hand circular polarization navigation satellite signals reflected by high buildings or the ground, so as to reduce the multipath (Continued)

interference, thus effectively improving the positioning accuracy of the positioning antenna of the wearable device.

17 Claims, 8 Drawing Sheets

(56) References Cited

U.S. PATENT DOCUMENTS

| | | | |
|---|---|---|---|
| 2008/0252521 | A1 | 10/2008 | Sabet et al. |
| 2008/0284661 | A1 | 11/2008 | He |
| 2009/0179816 | A1 | 7/2009 | Chen et al. |
| 2010/0045553 | A1 | 2/2010 | Ohira et al. |
| 2016/0204518 | A1 | 7/2016 | Yamagajo et al. |
| 2017/0133762 | A1 | 5/2017 | Ng et al. |

FOREIGN PATENT DOCUMENTS

| | | | | | |
|---|---|---|---|---|---|
| CN | 104901012 | A | | 9/2015 | |
| CN | 106992363 | A | | 7/2017 | |
| CN | 206541921 | U | | 10/2017 | |
| CN | 107925156 | A | | 4/2018 | |
| CN | 110828994 | A | | 2/2020 | |
| CN | 111478055 | A | | 7/2020 | |
| CN | 211743422 | U | | 10/2020 | |
| EP | 0942488 | B1 | | 9/2004 | |
| EP | 2846398 | A2 | | 3/2015 | |
| JP | 2001119232 | A | | 4/2001 | |
| JP | 200633798 | A | * | 2/2006 | ............... H01Q 1/24 |
| JP | 2011130002 | A | | 6/2011 | |
| JP | 2012124869 | A | | 6/2012 | |
| WO | 2018180875 | A1 | | 10/2018 | |

OTHER PUBLICATIONS

International Search Report and Written Opinion issued in corresponding PCT Application No. PCT/CN2020/142292, dated Mar. 8, 2021.

Second Office Action issued in counterpart Chinese Patent Application No. 202011637128.0, dated Apr. 25, 2023.

Tang et al., A VHF-frequency spin circularly polarized self-restraining antenna, 2019 National Conference on Antenna Proceedings (Part II), 2019, pp. 1563-1565, dated Dec. 31, 2019.

Wang et al., Miniaturized Dual-Band Circularly Polarized Quadruple Inverted-F Antenna for GPS Applications, IEEE Antennas and Wireless Propagation Letters, 2018, 17(6), pp. 1109-1113, dated May 8, 2018.

Wu et al., A Wideband Circularly Polarized Patch Antenna With Enhanced Axial Ratio Bandwidth via Co-Design of Feeding Network, IEEE Transactions on Antennas and Propagation, 2018, 66(10), pp. 4996-5003, dated Jun. 29, 2018.

Zhou et al., Broadband Circularly Polarized Dual Loop Antenna Fed by Coplane Stripline, Radio Engineering, 2010, 40 (5), pp. 40-42, dated Dec. 31, 2010.

Singaporean Search Report issued in counterpart Singaporean Patent Application No. SG 11202260680P, dated Feb. 20, 2024.

* cited by examiner

SINGLE-FREQUENCY CIRCULAR POLARIZATION POSITIONING ANTENNA AND WEARABLE DEVICE

CROSS-REFERENCE TO RELATED APPLICATIONS

The application is a continuation of International Application PCT/CN2020/142292, filed on Dec. 31, 2020, which claims priority to Chinese Patent Application CN202010470797.7, filed on May 28, 2020 and Chinese Patent Application CN202020941597.0, filed on May 28, 2020, which are incorporated herein by reference in their entireties.

TECHNICAL FIELD

The present application belongs to the technical field of antennas, in particular, to a single-frequency circular polarization positioning antenna and a wearable device.

BACKGROUND

In the field of smart watches or bracelets, people always pay attention to the positioning accuracy. Positioning antennas of most traditional smart watches or bracelets are linear polarization antennas, but a signal emitted by a navigation satellite is a right hand circular polarization signal after passing through an ionized stratum. Therefore, the positioning antennas of the smart watches or bracelets cannot receive all the signals of the navigation satellite, and the signals of the navigation satellite will become left hand circular polarization signals after being reflected by the ground, high buildings, trees and the like by an odd number of times, so that multipath interference will be generated, which severely affects the positioning effect of the whole machine.

SUMMARY

The present application aims to provide a single-frequency circular polarization positioning antenna and a wearable device, so as to solve the technical problem of relatively low positioning accuracy of an antenna of an existing wearable device.

In order to solve the above problem, an embodiment of the present application adopts the following technical solution:

In one aspect, an embodiment of the present application provides a single-frequency circular polarization positioning antenna, including:

an inverted F antenna, wherein the inverted F antenna is provided with a first long edge, a feed end and a first ground end; a distance from the feed end to a tail end of the first long edge is shorter or longer than a distance from the first ground end to the tail end of the first long edge; and a parasitic antenna, wherein the parasitic antenna is coupled to the tail end of the first long edge; the parasitic antenna is arranged on one side of the tail end of the first long edge; the inverted F antenna and the parasitic antenna form an angle;

wherein when the inverted F antenna and the parasitic antenna resonate near a working frequency point, electrical signals on the inverted F antenna and the parasitic antenna are equal in amplitude, and a phase difference is 90°.

In one embodiment, the parasitic antenna is in an inverted F shape; the parasitic antenna is provided with a second long edge, a second ground end and a third ground end; the second ground end is close to the tail end of the first long edge; a tail end of the second long edge is away from the tail end of the first long edge; and a distance from the second ground end to the tail end of the second long edge is longer than a distance from the third ground end to the tail end of the second long edge.

In one embodiment, the parasitic antenna is in an inverted L shape; the parasitic antenna is provided with a second long edge and a second ground end; the second ground end is close to the tail end of the first long edge; and a tail end of the second long edge is away from the tail end of the first long edge.

In one embodiment, the parasitic antenna is in a T shape; the parasitic antenna is provided with a second long edge and a second ground end; the second ground end is close to the tail end of the first long edge; and a tail end of the second long edge is away from the tail end of the first long edge.

In one embodiment, equivalent lengths of the first long edge and the second long edge correspond to a working wavelength of the single-frequency circular polarization positioning antenna.

In one embodiment, further including a substrate, the inverted F antenna and the parasitic antenna are vertically arranged on the substrate.

In one embodiment, the inverted F antenna and/or the parasitic antenna are loaded with induction devices.

In one embodiment, the angle ranges from 75° to 105°.

In one embodiment, a coupling slot is formed between the tail end of the first long edge and the parasitic antenna, and the coupling slot is adjusted to adjust a coupling degree between the inverted F antenna and the parasitic antenna.

In second aspect, an embodiment of the present application provides a single-frequency circular polarization positioning antenna, including:

an inverted F antenna, wherein the inverted F antenna is provided with a first long edge, a feed end and a first ground end; a distance from the feed end to a tail end of the first long edge is shorter or longer than a distance from the first ground end to the tail end of the first long edge; and a parasitic antenna, wherein the parasitic antenna is provided with a second long edge; a tail end of the second long edge is spaced apart from and coupled with the tail end of the first long edge; the parasitic antenna is arranged on one side of the tail end of the first long edge; the inverted F antenna and the parasitic antenna form an angle;

wherein when electrical signals respectively loaded to the inverted F antenna and the parasitic antenna satisfy that the amplitudes are equal and a phase difference is 90°, circular polarization radiation is generated.

In one embodiment, a length of the first long edge and a length of the second long edge is adjusted to adjust a frequency offset occurring at a minimum axial ratio of the circular polarization radiation.

In one embodiment, the parasitic antenna is an inverted L shape or a T shape; the parasitic antenna further includes a second ground end; and a distance from the second ground end to the tail end of the second long edge is longer than or shorter than a distance from the second ground end to a start end of the second long edge.

In one embodiment, equivalent lengths of the first long edge and the second long edge correspond to a working wavelength of the single-frequency circular polarization positioning antenna.

In one embodiment, further including a base plate, wherein the inverted F antenna and the parasitic antenna are vertically arranged on the base plate.

In one embodiment, the angle ranges from 75° to 105°.

In one embodiment, a coupling slot is formed between the tail end of the first long edge and the second long edge, and the coupling slot is adjusted to adjust a coupling degree between the inverted F antenna and the parasitic antenna.

In one embodiment, a feed end of the inverted F antenna is connected to a first radio frequency port of the circuit board; and the first ground end of the inverted F antenna is connected to a ground port of the circuit board.

In third aspect, an embodiment of the present application provides a wearable device including a circuit board and the above antenna, wherein a feed end of the inverted F antenna is connected to a first radio frequency port of the circuit board; and the first ground end of the inverted F antenna is connected to a ground port of the circuit board.

The first single-frequency circular polarization positioning antenna provided by the embodiment of the present disclosure has the beneficial effects: in the above-mentioned single-frequency circular polarization positioning antenna, resonance is generated on the parasitic antenna through a coupling effect by means of feeding the inverted F antenna, so that the overall structure of the circular polarization antenna is simplified, and is achieved on a wearable product more easily. By means of controlling position relationship of the two antennas, so that distribution currents can have equal amplitudes at a desired working frequency point and have a phase difference of 90°, and a polarization manner of the positioning antenna is right hand circular polarization. Therefore, the positioning antenna can better receive the signals of the navigation satellite, and the generated right hand circular polarization radiation can also filter left hand circular polarization navigation satellite signals reflected by high buildings or the ground, so as to reduce the multipath interference, thus effectively improving the positioning accuracy of the positioning antenna of the wearable device.

The second single-frequency circular polarization positioning antenna provided by the embodiment of the present disclosure has the beneficial effects: in the above-mentioned single-frequency circular polarization positioning antenna, resonance is generated on the parasitic antenna through a coupling effect by means of feeding the inverted F antenna, so that the overall structure of the circular polarization antenna is simplified, and is achieved on a wearable product more easily. By means of controlling the electrical signals loaded to the two antennas, the polarization manner of the positioning antenna can be the right hand circular polarization at the desired working frequency point due to the electrical signals. Therefore, the positioning antenna can better receive the signals of the navigation satellite, and the generated right hand circular polarization radiation can also filter left hand circular polarization navigation satellite signals reflected by high buildings or the ground, so as to reduce the multipath interference, thus effectively improving the positioning accuracy of the positioning antenna of the wearable device.

The wearable device provided by the embodiment of the present disclosure has the beneficial effects: the above wearable device uses all the above embodiments of the single-frequency circular polarization positioning antenna, so it has at least all the beneficial effects of the above embodiments, which are not detailed here.

BRIEF DESCRIPTION OF THE DRAWINGS

In order to more clearly explain the technical solutions in the embodiments of the present application, the following will briefly introduce the drawings required in the embodiments or exemplary technical descriptions. Obviously, the drawings in the following description are only for the application. In some embodiments, for those of ordinary skill in the art, without paying any creative labor, other drawings may be obtained based on these drawings.

DETAILED DESCRIPTION OF THE EMBODIMENTS

In order to solve the technical problem to be solved by the present application, the technical solution and beneficial effect are more clearly understood, the following combine the accompanying drawings and examples, for further detailed explanation of this application. It should be understood that the specific embodiment described herein is only for explaining the application, and not for defining the application.

It should be noted that, when the element is referred to as "fixed to" or "set on" another element, it can be directly on the other element or indirectly on the other element. When one element is referred to as "connected to" another element, it may be directly connected to another element or indirectly connected to the other element.

It should be understood that the terms "length", "width", "upper", "lower", "front", "back", "left", "right", "vertical", "horizontal", "top", "bottom"; orientation or position relation of the "outer" indication is based on the orientation or position relation shown in the accompanying drawings, only in order to facilitate the description of the invention and simplify the description, and not to indicate or imply the device or element must have a specific orientation, to a specific orientation structure and operation, so it cannot be understood as the limit of the present application.

In addition, the term "first", "second" are used only for the purpose of description, and cannot be understood as indicating or implying relative importance or implicitly indicating the number of technical features indicated. Thus, defining a "first", the characteristic of "second" can be displayed or implicitly comprises one or more of the features. In the description of the present application, the meaning of "a plurality of" is two or more than two, unless specifically defined specifically.

One of the basic functions of an intelligent wearable device is positioning and navigation. The improvement of the positioning accuracy can significantly improve the user experience, which is one of the key technical difficulties of the current industry. Generally, the positioning accuracy can be improved by an algorithm and hardware. A technical bottleneck of a wearable device mainly lies in hardware, particularly in an antenna, which is mainly embodied in three aspects. First, the antenna efficiency of the wearable device is generally extremely low, resulting in weak received satellite signals and low signal noise ratios. Second, most of current positioning and navigation antennas for wearable devices are linear polarization antennas. When this type of antenna receives a circular polarization satellite signal, this type of antenna naturally has a gain loss of 3 dB due to polarization mismatch. Finally, multipath reflected signals are the main source of a positioning error, and the linear polarization antenna receive all multipath reflected circular polarization signals, so that interference signals not suppressed.

Figure 1:
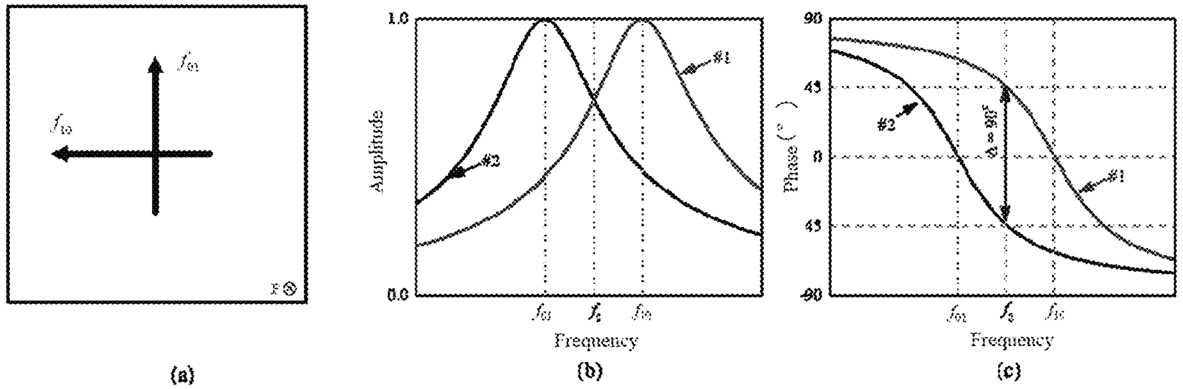
FIG. 1 is a single feedback-type circular polarization antenna based on degenerate mode separation and a working principle thereof.
Figure 2:
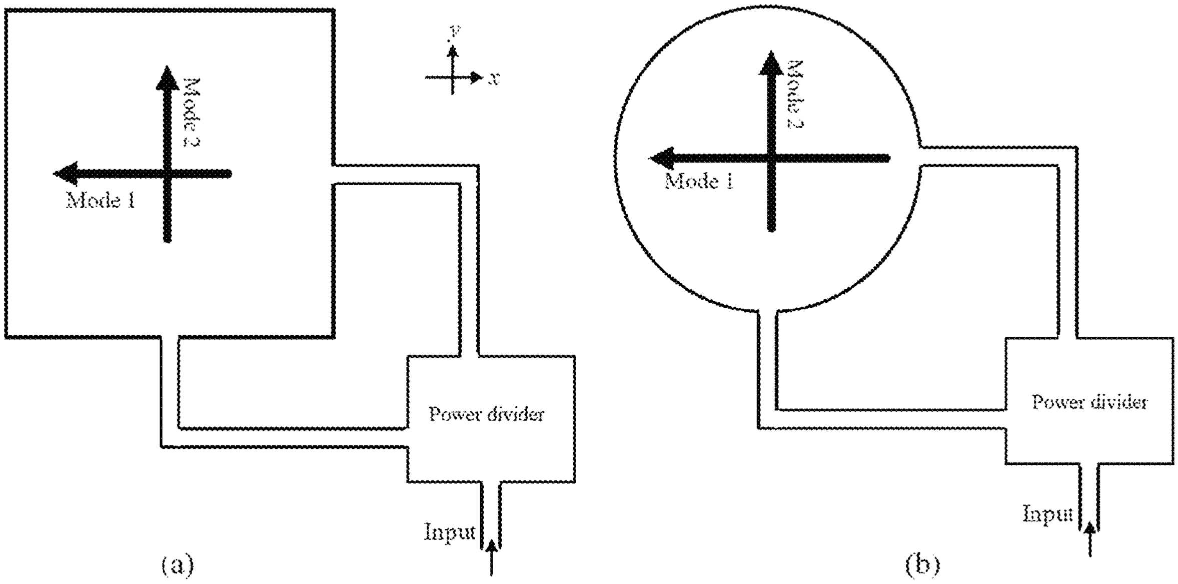
FIG. 2 is a double-feedback circular polarization antenna based on an external phase shifter/power divider.

Compared with the linear polarization antenna, when a circular polarization antenna receives satellite signals, there will be 3 dB more gain, and multipath reflected signals can be suppressed, thus effectively improving the signal noise ratio. The circular polarization antenna can significantly improve the positioning accuracy and is widely used in a positioning and navigation device. In view of the basic working principle, to achieve circular polarization, a pair of orthogonal far-field components needs to be generated and should meet the following conditions: the amplitudes are equal and the phase difference is 90 degrees. According to the different antenna structures and implementation manners, there may be generally two types of circular polarization antennas widely used at the present. The first type of circular polarization antenna is based on a single feed point structure. As shown in FIG. 1, disturbance is added to a pair of orthogonal degenerate modes in which a common feed point is used to simultaneously stimulate the same antenna, so that the degenerate modes are separated. At a central frequency point, the two modes just satisfy the conditions: the amplitudes are equal and the phase difference is 90 degrees. For this antenna, the phase difference is determined by the separation degree of the degenerate modes. The second circular polarization antenna is based on a double-fed/multi-fed structure. As shown in FIG. 2, an external power divider and a phase shifter are used to feed an antenna to stimulate a pair of orthogonal modes. The desired amplitude and phase are determined by an external feed structure.

However, a traditional circular polarization antenna cannot be directly applied to a wearable device due to the following three reasons. First of all, a traditional double-fed/multi-fed circular polarization antenna requires an additional phase shifter and power divider, which are complex in structure, large in size and high in cost. However, the wearable device has an extremely limited space and is sensitive to cost, so it does not meet the requirements. Secondly, although a traditional single-fed circular polarization antenna has a simple structure, its circular polarization performance is extremely sensitive. When a frequency size relationship of the two orthogonal modes changes, its phase lag or lead relationship will change accordingly, so that its polarization manner will also easily degenerate from right hand circular polarization to linear polarization or to left hand circular polarization. In the complex application environment of the wearable device, its performance cannot be kept stable. Finally, in order to obtain a pair of orthogonal modes, a traditional circular polarization antenna is generally based on a symmetric antenna structure, such as a rectangle, a circle, and a ring. Multiple antennas need to be arranged in a narrow headroom. Only 1-2 edges of the contour of a positioning and navigation antenna can be used, so that the structure is not symmetric, and an electromagnetic boundary is exceptionally complicated.

For these problems, the present application provides a circular polarization antenna which does not rely on a symmetric antenna structure, has an extremely small size, is stable in polarization and axial ratio performance, and is more applicable to a wearable device. Different from the traditional circular polarization antenna, the present application does not use a pair of degenerate modes of the same antenna, but uses a pair of coupling antennas. Compared with the traditional circular polarization antenna, the present application has a totally different phase shift generation mechanism, and the phase difference of 90 degrees required by circular polarization is generated using electromagnetic coupling between antennas, instead of relying on degenerate mode separation or an external phase shifter.

Figure 3A:
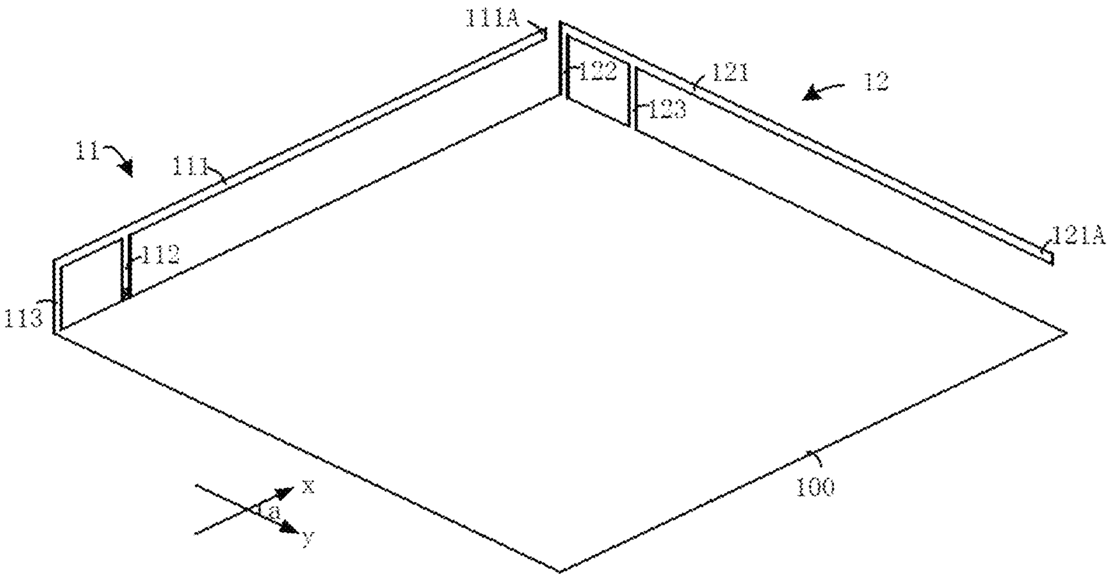
FIG. 3A is a schematic structural diagram of a single-frequency circular polarization positioning antenna provided according to Embodiment I of the present application.
Figure 3B:
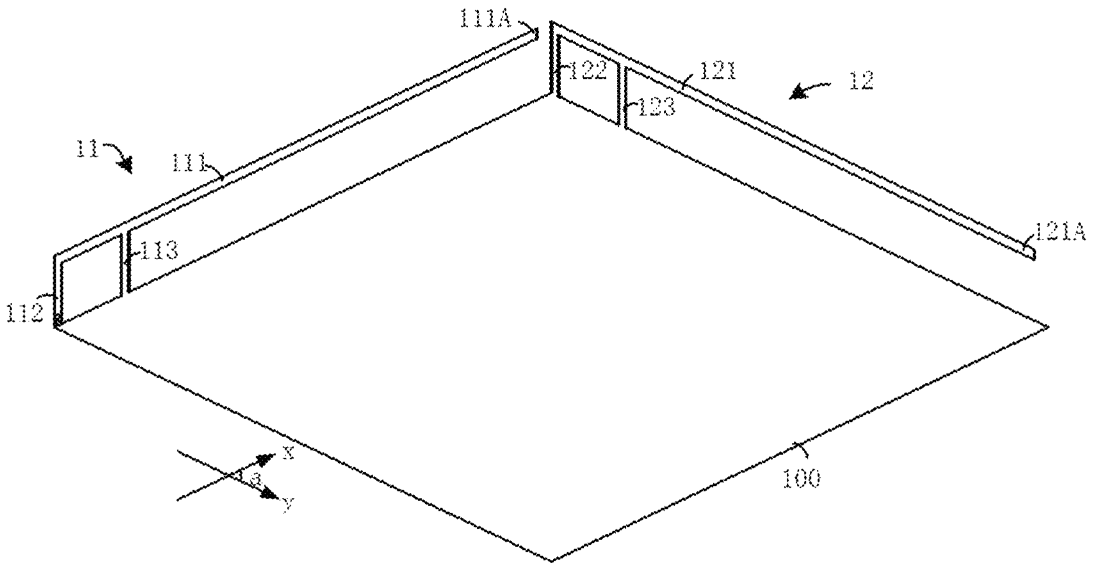
FIG. 3B is a schematic structural diagram of a single-frequency circular polarization positioning antenna provided according to Embodiment II of the present application.

Referring to FIG. 3A and FIG. 3B, the single-frequency circular polarization positioning antenna applicable to a wearable device provided according to one embodiment of the present application includes an inverted F antenna 11 and a parasitic antenna 12.

In some embodiments, the inverted F antenna 11 and the parasitic antenna 12 are vertically arranged on the same surface (a front surface) of a dielectric substrate 100. For example, the inverted F antenna 11 and the parasitic antenna 12 are perpendicular to the dielectric substrate 100, and the dielectric substrate 100 is a ground plate for grounding the single-frequency circular polarization positioning antenna.

The inverted F antenna 11 is provided with a first long edge 111, a feed end 112 and a first ground end 113. A distance from the feed end 112 to a tail end of the first long edge 111 is shorter than or longer than a distance from the first ground end 113 to the tail end 111A of the first long edge 111. In an example of FIG. 3A, the distance from the feed end 112 to the tail end of the first long edge 111 is shorter than the distance from the first ground end 113 to the tail end of the first long edge 111. In an example of FIG. 3B, the distance from the feed end 112 to the tail end of the first long edge 111 is longer than the distance from the first ground end 113 to the tail end 111A of the first long edge 111. That is, in this embodiment, one of two end portions of the inverted F antenna 11 connected with the first long edge 111 may be used as the ground end for grounding according to a current distribution, a size dimension or performance, and the other one is used as the feed end 112 for feeding. The performances in the two implementations are close. During application, either implementation can be selected according to a need, which is not limited here.

The inverted F antenna 11 is disposed along a first direction x. The parasitic antenna 12 is in slot coupling with a tail end 111A of the first long edge 111. The parasitic antenna 12 is arranged on one side of the tail end 111A of the first long edge 111, and the inverted F antenna 11 and the parasitic antenna 12 form an angle a. The parasitic antenna 12 extends along a second direction y. An included angle between the first direction x and the second direction y is the angle a. Furthermore, when the inverted F antenna 11 and the parasitic antenna 12 resonate near a working frequency point, such as 1.575 GHz of band L1 or 1.176 GHz of band L5 of a global positioning system (GPS), electrical signals (electric field or current signals) on the inverted F antenna 11 and the parasitic antenna 12 satisfy the following conditions: the amplitudes are equal and a phase difference is 90°, so as to form resonances in two orthogonal modes and generate a circular polarization radiation.

More specifically, as shown in FIG. 3A and FIG. 3B, seen from the top of the front surface of the dielectric substrate 100, the parasitic antenna 12 needs to be located in a clockwise direction (i.e. a right side) of the inverted F antenna 11, so as to ensure: when the inverted F antenna 11 and the parasitic antenna 12 resonate near the working frequency point, the current amplitudes of the inverted F antenna 11 and the parasitic antenna 12 are equal, and a difference between a current phase of the inverted F antenna and a current phase on the parasitic antenna 12 is 90°, so that right hand circular polarization radiation can be achieved.

Optionally, the angle a between the inverted F antenna 11 and the parasitic antenna 12, i.e., between the first direction x and the second direction y, ranges from 70° to 110°. Since the inverted F antenna 11 and the parasitic antenna 12 are respectively set to be headroom regions in the two directions x and y forming the included angle a, when the inverted F antenna 11 and the parasitic antenna 12 resonate near the working frequency point, resonances in two orthogonal modes are formed, and a good circular polarization radiation is generated. Correspondingly, the circular polarization radiation is better if the included angle a is within a range of 75°-105°.

In one embodiment, projections of the inverted F antenna 11 and the parasitic antenna 12 on the dielectric substrate 100 are perpendicular to each other, that is, the included angle a is 90°. In the embodiment, the inverted F antenna 11 is fed, and the parasitic antenna 12 and the inverted F antenna 11 resonate by means of slot coupling and a coupling effect, thus simplifying the overall structure of the circular polarization antenna. The two antennas are in an orthogonal position relationship, so that distribution currents can have equal amplitudes at a desired working frequency point and have a phase difference of 90°, and a polarization manner of the positioning antenna is right hand circular polarization.

An embodiment of the present application provides three implementations of the parasitic antenna 12.

Referring to FIG. 3A and FIG. 3B, a first kind of parasitic antenna 12 is in an inverted F shape. The parasitic antenna 12 is provided with a second long edge 121, a second ground end 122 and a third ground end 123. The second ground end 122 of the parasitic antenna 12 is close to the tail end 111A of the first long edge 111 of the inverted F antenna 11. A tail end of the second long edge 121 of the parasitic antenna 12 is away from the tail end 111A of the first long edge 111 of the inverted F antenna 11, and a distance from the second ground end 122 of the parasitic antenna 12 to a tail end 121A of the second long edge 121 of the parasitic antenna 12 is longer than a distance from the third ground end 123 of the parasitic antenna 12 to the tail end 121A of the second long edge 121.

Figure 4:
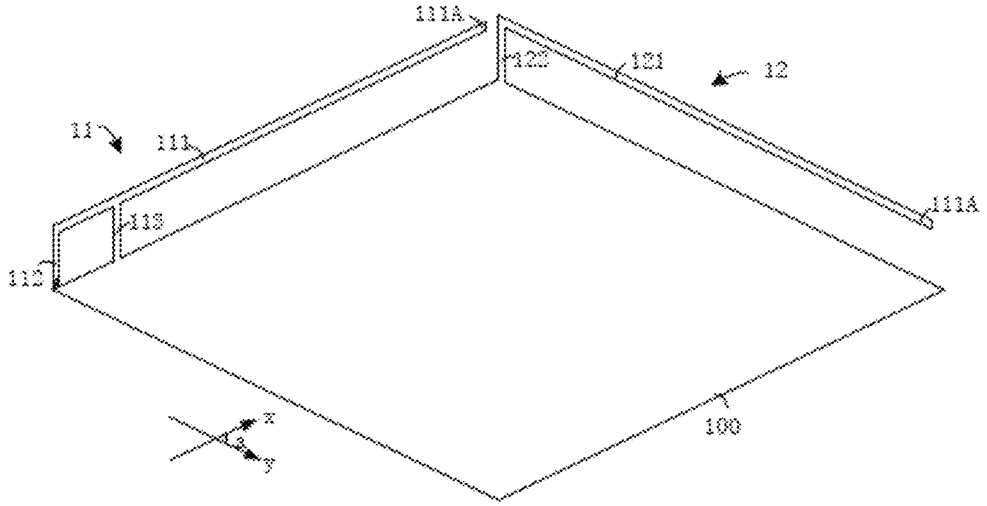
FIG. 4 is a schematic structural diagram of a single-frequency circular polarization positioning antenna provided according to Embodiment II of the present application.

Referring to FIG. 4, the second kind of parasitic antenna 12 is in an inverted L shape. The parasitic antenna 12 is provided with a second long edge 121 and a second ground end 122. The second ground end 122 is close to the tail end of the first long edge 111 of the inverted F antenna 11, and a tail end 121A of the second long edge 121 is away from the tail end 111A of the first long edge 111 of the inverted F antenna 11.

Figure 5:
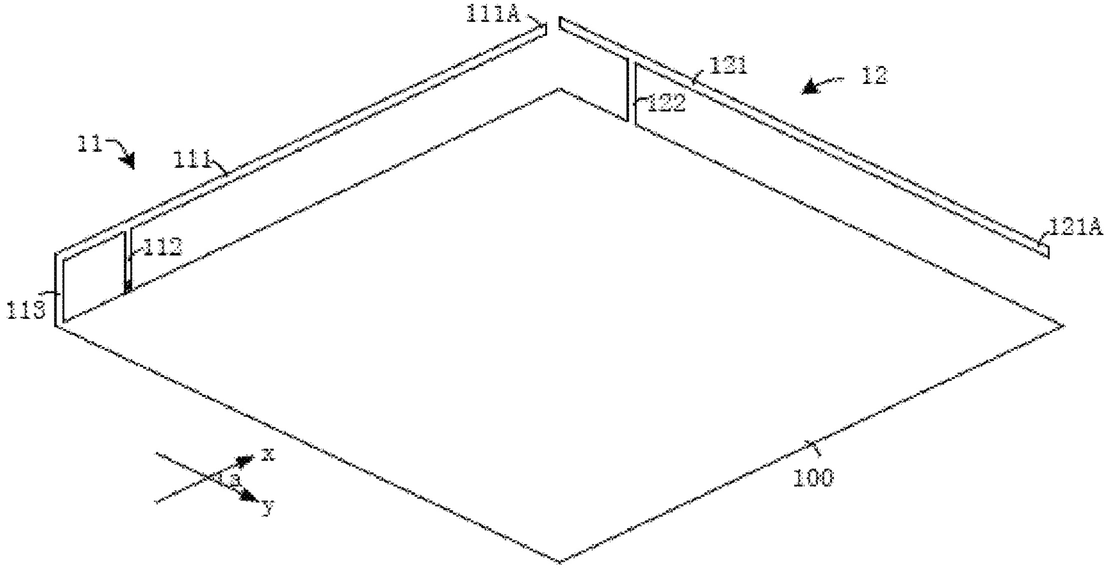
FIG. 5 is a schematic structural diagram of a single-frequency circular polarization positioning antenna provided according to Embodiment III of the present application.

Referring to FIG. 5, the third kind of parasitic antenna 12 is i a T shape. The parasitic antenna 12 is provided with a second long edge 121 and a second ground end 122. The second ground end 122 is close to the tail end of the first long edge 111 of the inverted F antenna 11, and a tail end 121A of the second long edge 121 is away from the tail end 111A of the first long edge 111 of the inverted F antenna 11.

In other implementations, the parasitic antenna 12 may be in other shapes, such as an inverted E shape. In the present application, a coupling slot is formed between the tail end 111A of the first long edge 111 of the inverted F antenna 11 and the parasitic antenna 12, and the coupling slot is adjusted to adjust a coupling degree between the inverted F antenna 11 and the parasitic antenna 12. The inverted F antenna 11 and the parasitic antenna 12 are in slot coupling for feeding. The parasitic antenna 12 inducts a radiation field of the inverted F antenna 11 and then generates a current. Furthermore, matching and tuning are easier due to the slot coupling for feeding. The coupling degree can be adjusted by adjusting a space of the coupling slot, thus achieving matching and tuning of antennas.

Equivalent lengths of the first long edge 111 and the second long edge 121 correspond to a working wavelength of the single-frequency circular polarization positioning antenna. For example, the equivalent lengths of the first long edge 111 and the second long edge 121 are basically equal to the working wavelength of the single-frequency circular polarization positioning antenna, or the equivalent lengths of the first long edge 111 and the second long edge 121 are basically equal to ¼ of the working wavelength of the single-frequency circular polarization positioning antenna, which ensures that the antenna resonates at a desired frequency point.

In one embodiment, the inverted F antenna 11 and/or the parasitic antenna 12 are/is loaded with induction devices (not shown). The induction device is a lumped induction device or a distributed induction device. In this embodiment, the induction device is mainly used for prolonging the equivalent length of the first antenna, so as to reduce the size of the positioning antenna, thus effectively minimizing the antenna. Optionally, the induction device may usually be the lumped induction device, i.e., an inductor, or may be routed in a bent manner like a snake shape.

Figure 6:
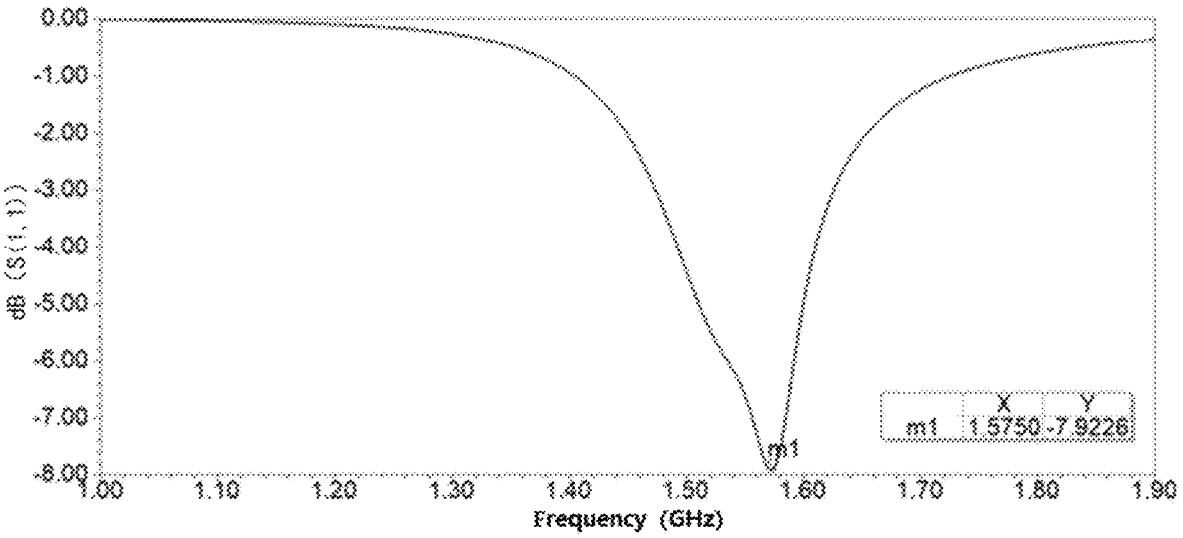
FIG. 6 is a schematic diagram of a parameter S of a single-frequency circular polarization positioning antenna provided according to an embodiment of the present application.

It can be seen from FIG. 6 that the above-mentioned single-frequency circular polarization positioning antenna resonates at 1.575 GHz, and an impedance bandwidth (S11<−6 dB) can completely cover the entire GPS-L1 band (1575±2 MHz), which indicates that the above-mentioned positioning antenna well receives signals of a navigation satellite.

Figure 7:
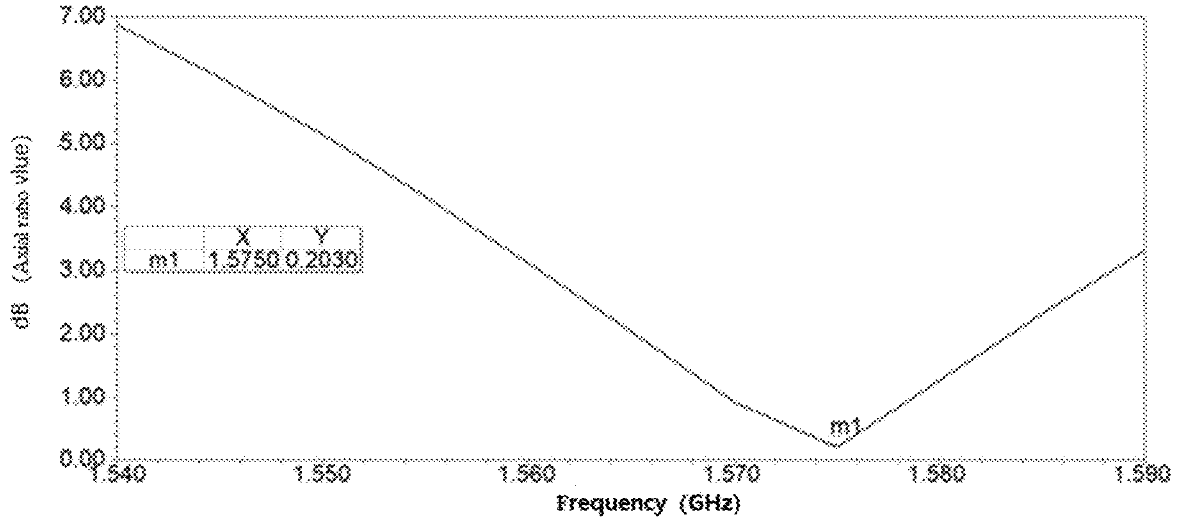
FIG. 7 is a top two-dimensional axial ratio simulation diagram of a single-frequency circular polarization positioning antenna provided according to an embodiment of the present application.
Figure 8:
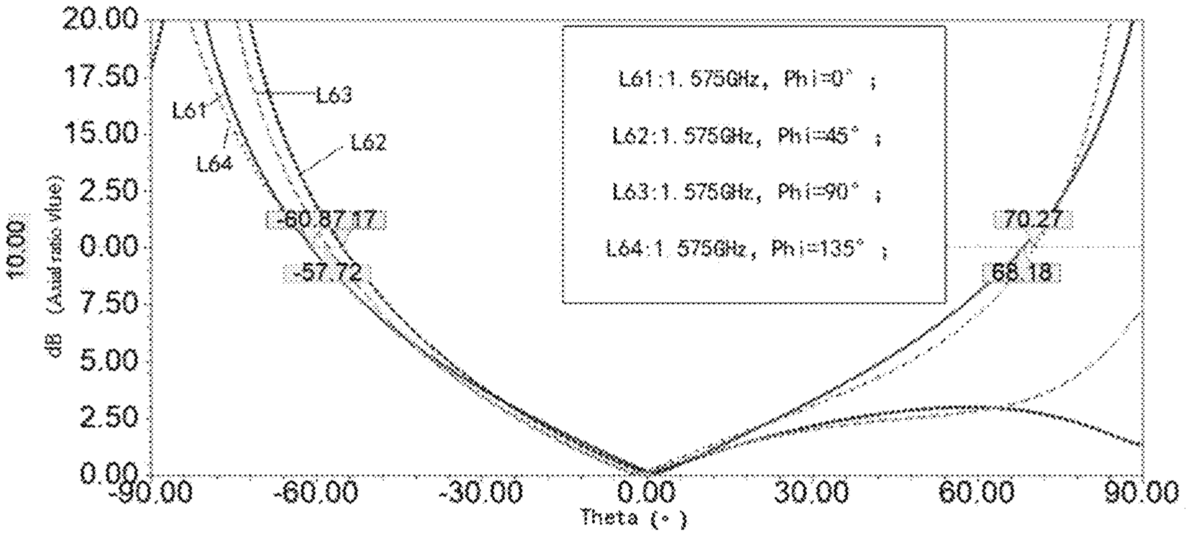
FIG. 8 is a two-dimensional four-axial ratio simulation diagram of a single-frequency circular polarization positioning antenna provided according to an embodiment of the present application at sections of phi=0°, 45°, 90°, and 135°.

It can be seen from FIG. 7 and FIG. 8 that when the above-mentioned positioning antenna works at band L1 (1575±2 MHz) of the GPS, an axial ratio of a top (phi=0°, theta=0° of the positioning antenna is below 1 dB; and when the above-mentioned antenna works at 1.575 GHz of band L1 of the GPS and has sections of phi=0°, 45°, 90°, and 135°, within a range of θ=−60°-70°, the axial ratio of the positioning antenna is less than 10 dB, which indicates that the axial ratio characteristic of the above-mentioned positioning antenna is good and meets the performance requirement for the positioning antenna.

Figure 9:
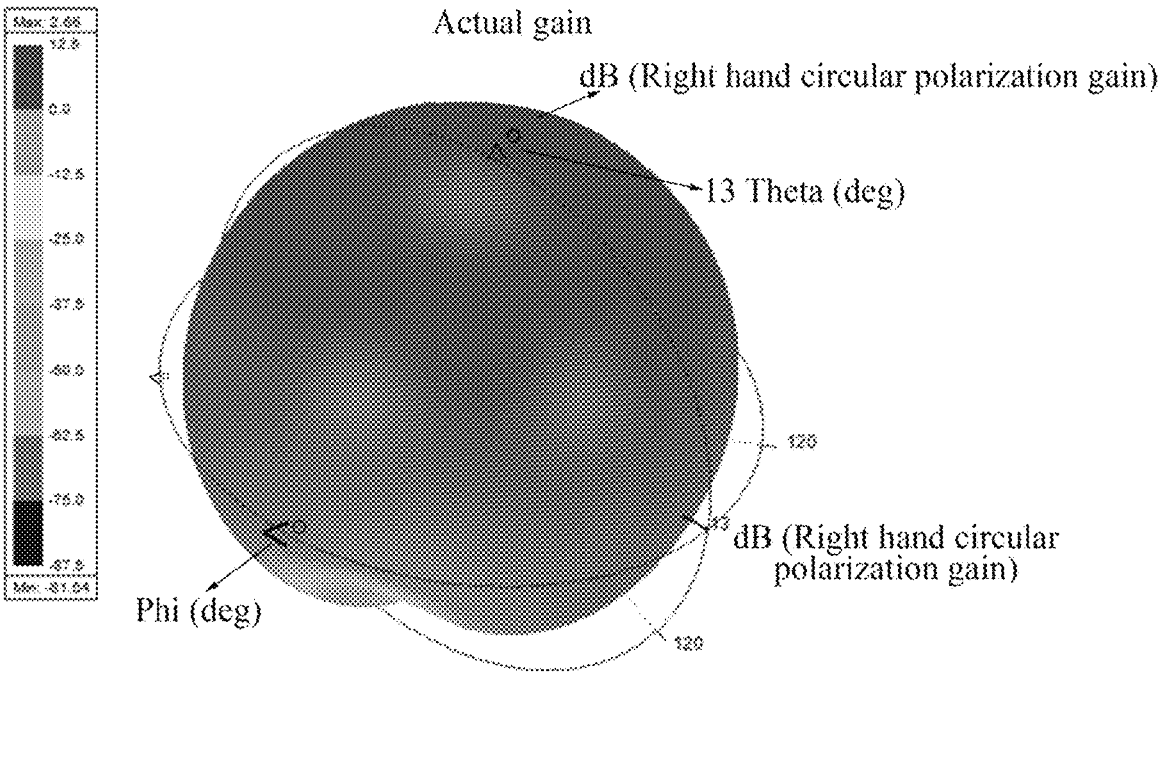
FIG. 9 is a three-dimensional directional diagram of a single-frequency circular polarization positioning antenna provided according to an embodiment of the present application.
Figure 10:
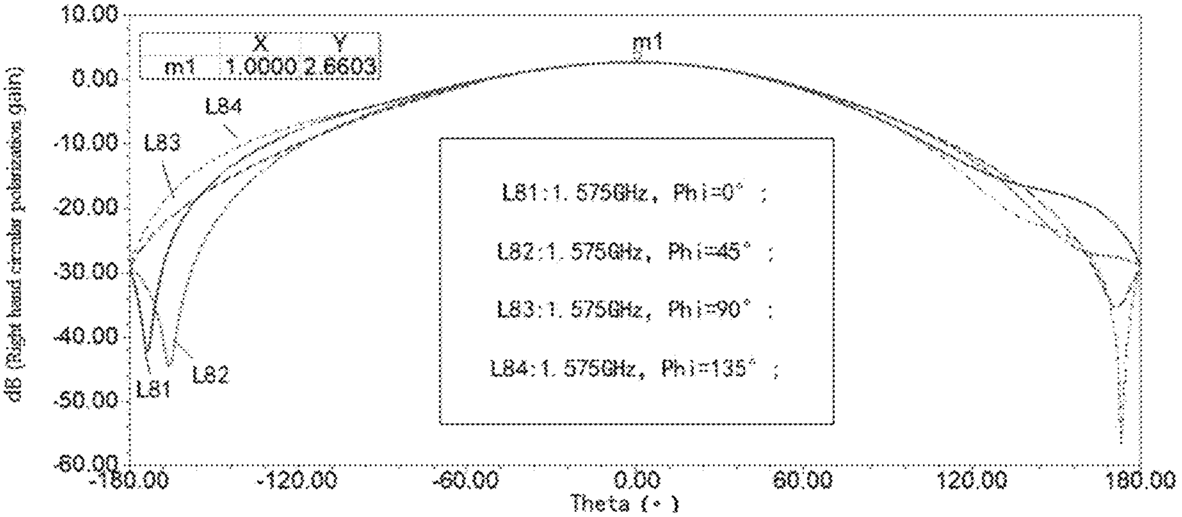
FIG. 10 is a two-dimensional directional diagram of a single-frequency circular polarization positioning antenna provided according to an embodiment of the present application.

It can be seen from FIG. 9 and FIG. 10 that when the above-mentioned positioning antenna works at 1.575 GHz of band L1 of the GPS, the right hand circular polarization gain of the top (phi=0°, theta=0° of the positioning antenna is 2.66 dB. If the gain is the same, a satellite signal received by the circular polarization antenna is greater than a signal received by the linear polarization antenna by 3 dB, and meanwhile, an interference signal is suppressed. Therefore, the positioning effect of the above-mentioned positioning antenna is better than that of the traditional linear polarization antenna.

Figure 11:
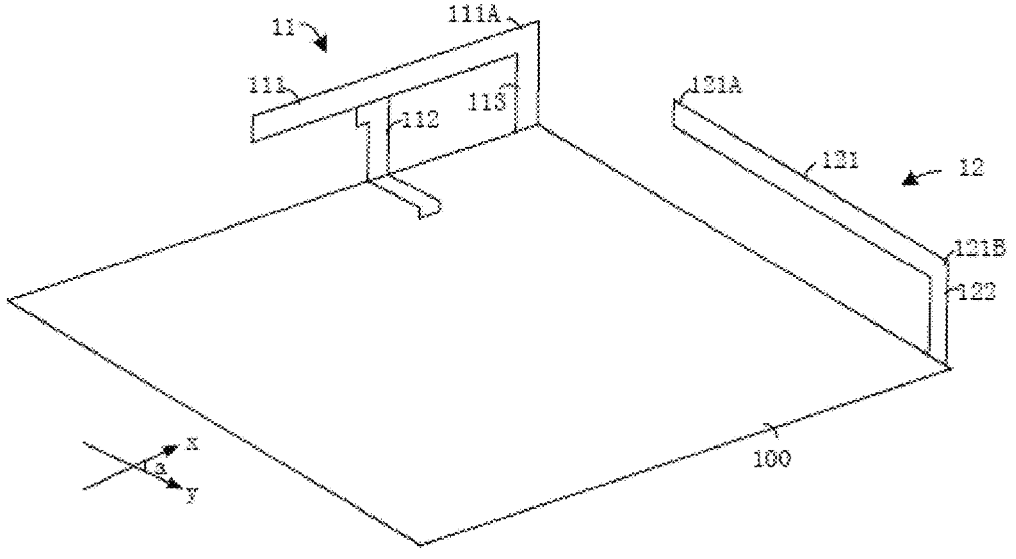
FIG. 11 is a schematic structural diagram of a single-frequency circular polarization positioning antenna provided according to Embodiment IV of the present application.

Referring to FIG. 11, a single-frequency circular polarization positioning antenna applicable to a wearable device provided according to another embodiment of the present application includes an inverted F antenna 11 and a parasitic antenna 12.

The inverted F antenna 11 is provided with a first long edge 111, a feed end 112, and a first ground end 113. A distance from the feed end 112 to a tail end 111A of the first long edge 111 is shorter or longer than a distance from the first ground end 113 to the tail end 111A of the first long edge 111. The parasitic antenna 12 is provided with a second long edge 121. A tail end 121A of the second long edge 121 is spaced apart from and coupled with the tail end 111A of the first long edge 111. The parasitic antenna 12 is arranged on one side of the tail end 111A of the first long edge 111. The inverted F antenna 11 and the parasitic antenna 12 form an angle a. When electrical signals respectively loaded to the inverted F antenna 11 and the parasitic antenna 12 satisfy that the amplitudes are equal and a phase difference is 90°, circular polarization radiation is generated.

Referring to FIG. 11, in the present application, the inverted F antenna 11 is disposed along a first direction x. The second long edge 121 of the parasitic antenna 12 is spaced apart from and coupled with the tail end 111A of the first long edge 111. The parasitic antenna 12 is arranged on one side of the tail end 111A of the first long edge 111. The inverted F antenna 11 and the parasitic antenna 12 form an angle a. The parasitic antenna 12 extends along a second direction y. An included angle between the first direction x and the second direction y is the angle a. Furthermore, when electrical signals (electric field, voltage or current signals) loaded to the inverted F antenna 11 and the parasitic antenna 12 satisfy that the amplitudes are equal and a phase difference is 90°, and when the inverted F antenna 11 and the parasitic antenna 12 resonate near the working frequency point, such as 1.575 GHz of band L1 or 1.176 GHz of band L5 of the GPS, right circular polarization radiation is generated.

More specifically, as shown in FIG. 11, it only needs to ensure that seen from the top of the front surface of the dielectric substrate 100, the parasitic antenna 12 only needs to be located in a clockwise direction (i.e., the right side) of the inverted F antenna 11. When a difference between a voltage phase of the inverted F antenna 11 and a voltage phase of the parasitic antenna 12 is 90° and the amplitudes are equal, the single-frequency circular polarization positioning antenna of the present application can achieve right hand circular polarization radiation.

Optionally, the angle a between the inverted F antenna 11 and the parasitic antenna 12, i.e., between the first direction x and the second direction y, ranges from 70° to 110°. Since the inverted F antenna 11 and the parasitic antenna 12 are respectively set to be headroom regions in the two directions x and y forming the included angle a, when electrical signals (electric field, voltage or current signals) loaded to the inverted F antenna 11 and the parasitic antenna 12 satisfy that the amplitudes are equal and a phase difference is 90°, resonances of two orthogonal modes are formed, and a good circular polarization radiation is generated. Correspondingly, the circular polarization radiation is better if the included angle a is within a range of 75°-105°.

In one embodiment, projections of the inverted F antenna 11 and the parasitic antenna 12 on the dielectric substrate 100 are perpendicular to each other, that is, the included angle a is 90°. In the embodiment, the inverted F antenna 11 is fed, and the parasitic antenna 12 and the inverted F antenna 11 resonate by means of slot coupling and a coupling effect, thus simplifying the overall structure of the circular polarization antenna. The two antennas are in an orthogonal position relationship, so that distribution currents can have an equal amplitude at a desired working frequency point and have a phase difference of 90°, and a polarization manner of the positioning antenna is right hand circular polarization.

In the above-mentioned single-frequency circular polarization positioning antenna, resonance is generated on the parasitic antenna (12) through a coupling effect by means of feeding the inverted F antenna (11), so that the overall structure of the circular polarization antenna is simplified, and is achieved on a wearable product more easily. By means of controlling the electrical signals loaded to the two antennas, the polarization manner of the positioning antenna can be the right hand circular polarization at the desired working frequency point due to the electrical signals. Therefore, the positioning antenna can better receive the signals of the navigation satellite, and the generated right hand circular polarization radiation can also filter left hand circular polarization navigation satellite signals reflected by high buildings or the ground, so as to reduce the multipath interference, thus effectively improving the positioning accuracy of the positioning antenna of the wearable device.

Figure 13:
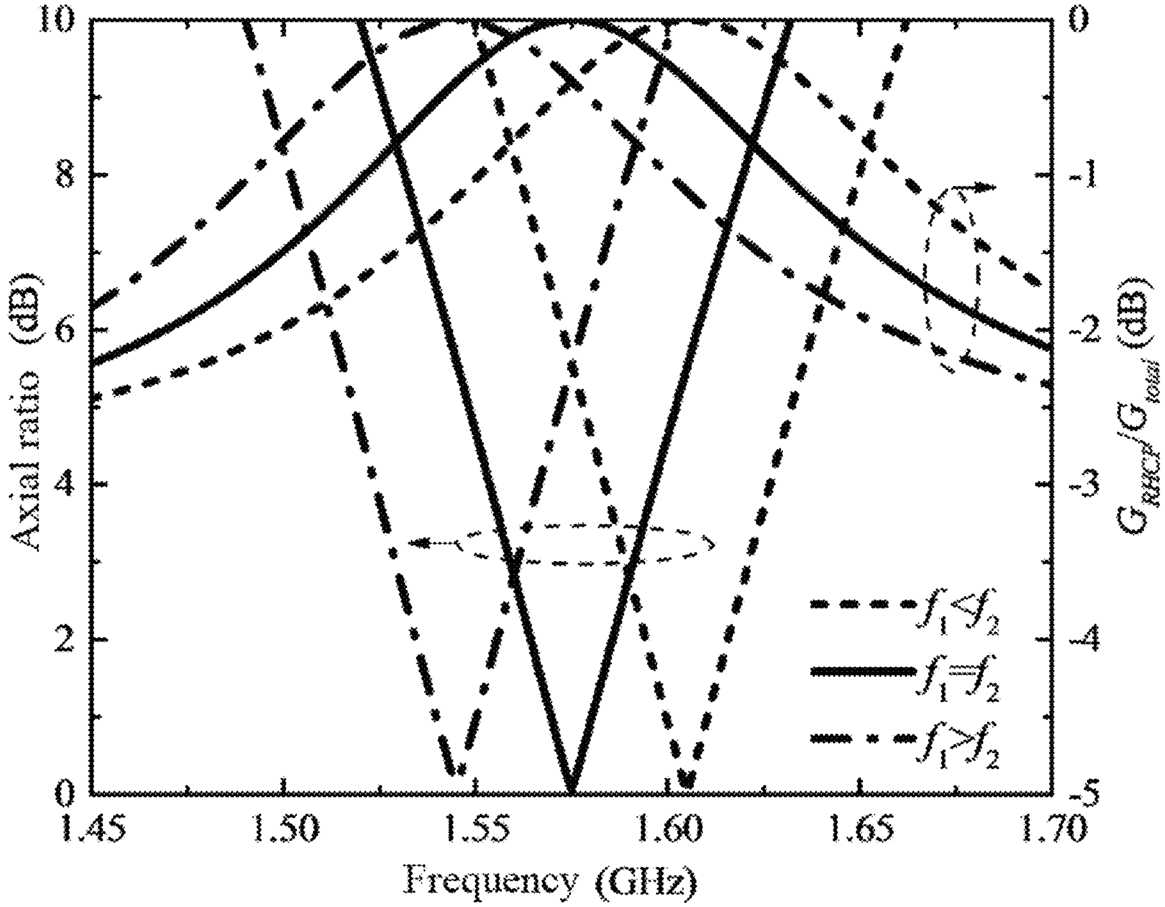
FIG. 13 shows theoretically calculated values of an axial ratio and a main polarization gain of a single-frequency circular polarization positioning antenna provided according to an embodiment of the present application.
Figure 14:
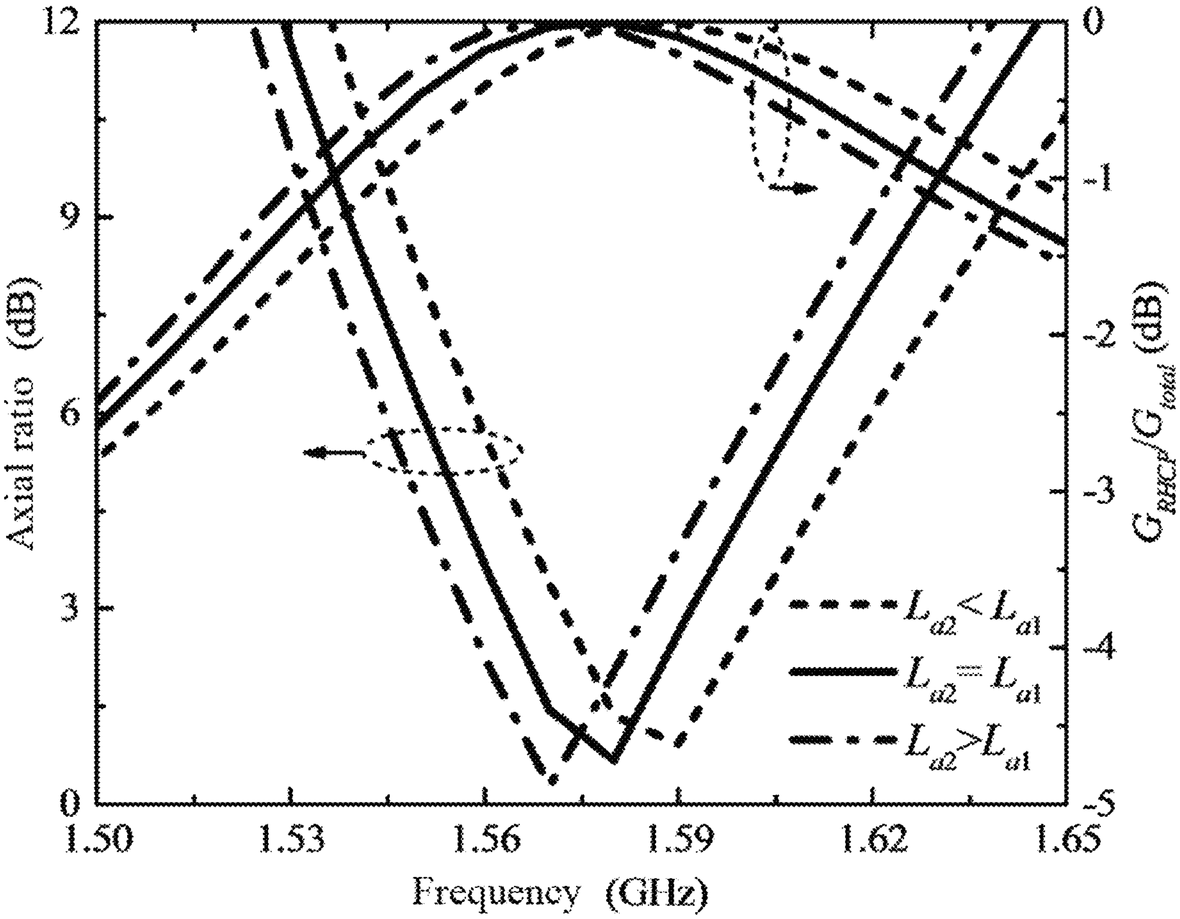
FIG. 14 shows theoretically simulated values of an axial ratio and a main polarization gain of a single-frequency circular polarization positioning antenna provided according to an embodiment of the present application.

In one embodiment, referring to FIG. 13 and FIG. 14, a length of the first long edge 111 and a length of the second long edge 121 is adjusted to adjust a frequency offset occurring at a minimum axial ratio of the circular polarization radiation. That is, the polarization manner of the antenna will not change even if resonance frequencies or lengths of two radiating units are changed. The antenna still works in the same circular polarization. Only the frequency corresponding to the minimum axial ratio has an offset, and the minimum axial ratio can reach an ideal value of 0 dB at one resonance frequency.

In one embodiment, the parasitic antenna 12 is in an inverted L shape or a T shape. The parasitic antenna 12 further includes a second ground end 122. A distance from the second ground end 122 to a tail end 121A of the second long edge 121 is longer than or shorter than a distance from the second ground end to a start end 121B of the second long edge 121.

In other implementations, the parasitic antenna 12 may be in other shapes, such as an inverted E shape. In the present application, a coupling slot is formed between the tail end 111A of the first long edge 111 of the inverted F antenna 11 and the parasitic antenna 12, and the coupling slot is adjusted to adjust a coupling degree between the inverted F antenna 11 and the parasitic antenna 12. The inverted F antenna 11 and the parasitic antenna 12 are in slot coupling for feeding. The parasitic antenna 12 inducts a radiation field of the inverted F antenna 11 and the generates a current. Furthermore, matching and tuning are easier due to the slot coupling for feeding. The coupling degree can be adjusted by adjusting a space of the coupling slot, thus achieving matching and tuning of antennas.

In one embodiment, equivalent lengths of the first long edge 111 and the second long edge 121 correspond to a working wavelength of the single-frequency circular polarization positioning antenna. For example, the equivalent lengths of the first long edge 111 and the second long edge 121 are basically equal to the working wavelength of the single-frequency circular polarization positioning antenna, or the equivalent lengths of the first long edge 111 and the second long edge 121 are basically equal to ¼ of the working wavelength of the single-frequency circular polarization positioning antenna, which ensures that the antenna resonates at a desired frequency point.

In one embodiment, the inverted F antenna 11 and/or the parasitic antenna 12 are/is loaded with induction devices (not shown). The induction device is a lumped induction device or a distributed induction device. In this embodiment, the induction device is mainly used for prolonging the equivalent length of the first antenna, so as to reduce the size of the positioning antenna, thus effectively minimizing the antenna. Optionally, the induction device may usually be the lumped induction device, i.e., an inductor, or may be routed in a bent manner like a snake shape.

In one embodiment, a dielectric substrate 100 is further included. The inverted F antenna 11 and the parasitic antenna 12 are vertically arranged on the same surface (a front surface) of the dielectric substrate 100. For example, the inverted F antenna 11 and the parasitic antenna 12 are perpendicular to the dielectric substrate 100, and the dielectric substrate 100 is a ground plate for grounding the single-frequency circular polarization positioning antenna and reflecting a radiation signal.

Figure 12:
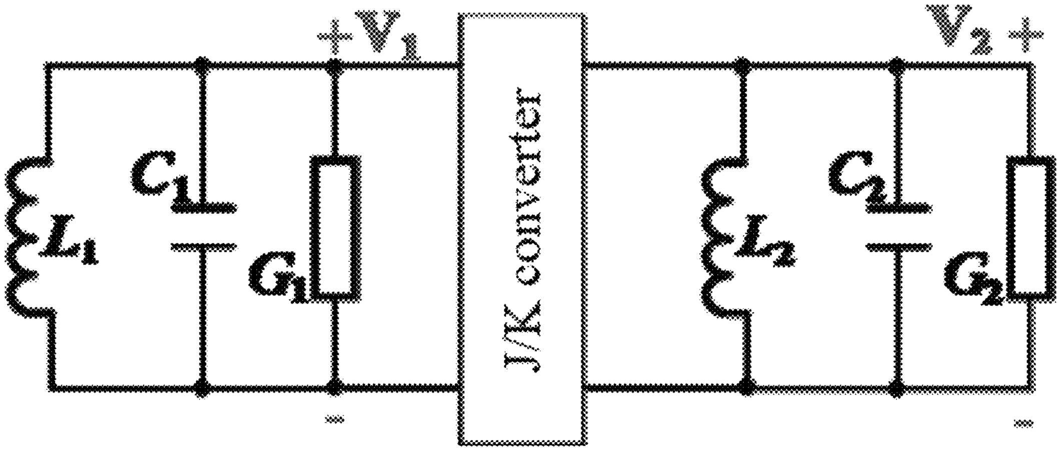
FIG. 12 is an equivalent circuit model of a single-frequency circular polarization positioning antenna provided according to an embodiment of the present application.

Referring to FIG. 3A, FIG. 3B, FIG. 4, FIG. 5, and FIG. 11, a main body portion of the antenna provided in the present application is composed of two radiating units (the inverted F antenna 11 and the parasitic antenna 12), which only occupy two edges of the ground plate (the ground substrate 100) and reserve an enough space for other antennas. The positioning antenna has only one feed point, which directly stimulates the first radiating unit, while the second radiating unit is not directly connected to an excitation port. There is electromagnetic coupling between the two antennas, through which energy transmission and exchange can be achieved. The two radiating units generate two orthogonal electric field components in a far field, and the amplitudes and phases of the electric field components are related to the amplitudes and phases of currents on the two radiating units. According to its working mechanism, the positioning antenna can be equivalent to a circuit model as shown in FIG. 12, in which, each radiating unit is equivalent to a lossy resonator (GLC), and the coupling between the radiating units is approximately replaced by a J converter or a K converter. A conductance G is equivalent to a radiation loss of each radiating unit. The voltages V1 and V2 at both ends of the radiating units are in direct proportion to a corresponding far-field vector. When V1 and V2 satisfy the conditions that the amplitudes are equal and a phase difference is 90 degrees, the positioning antenna just generates circular polarization radiation. According to the classical filter theory, the J/K converter can generate a phase shift of 90 degrees, which is also the key to achieve the circular polarization of the positioning antenna.

The working mechanism of the above-mentioned antenna is completely different from that of the traditional single-fed circular polarization antenna. To better illustrate this point, theoretical calculations and simulation verification are performed. For the traditional single-fed circular polarization antenna based on degenerate mode separation, it is assumed that the resonance frequencies of the two orthogonal modes are f1 (the resonance frequency of the inverted F antenna 11) and f2 (the resonance frequency of the parasitic antenna 12). Under the condition of $f1<f2$, the phase of mode 1 lags behind that of mode 2, right hand circular polarization is generated. Under the condition of $f1>f2$, the phase of mode 1 will become ahead of that of mode 2, left hand circular polarization is generated. Under the condition of $f1=f2$, the two frequencies are in phase, resulting in linear polarization. It can be seen that based on a traditional design method, when the resonance frequency of the radiating unit changes due to the impact of a material, a machining error and a use environment, the circular polarization performance will deteriorate dramatically. When one antenna changes from right hand circular polarization to left hand circular polarization, the antenna will not only fail to receive useful satellite signals, but also increase the possibility to receive interference signals, so that the positioning accuracy will deteriorate rapidly. In contrast, in the present application, if the resonance frequencies of two radiating units are changed (in the actual design, the change is realized by changing radiating arm lengths (i.e., the first long edge 111 and the second long edge 121)), the polarization manner of the antenna will not be changed. The theoretical calculation results based on the circuit model in FIG. 12 are as shown in FIG. 13. For the three cases of $f1<f2$, $f1=f2$ and $f1>f2$, the antenna works in the same circular polarization. Right hand circular polarization (RHCP) is taken as an example. The minimum axial ratio is an ideal value of 0 dB, and the only change is that the frequency corresponding to the minimum axial ratio has an offset. This kind of offset is completely acceptable in engineering. Since the axial ratio of a target frequency point is still in an acceptable range, the circular polarization performance is greatly reserved. Further, full wave simulation software is used to model an actual antenna and make simulation analysis to verify the performance of the antenna. As shown in FIG. 14, by changing the relative length of the two radiating units (the first long edge 111 corresponds to $L_{a1}$ and the second long edge 121 corresponds to $L_{a2}$), axial ratio and gain change rules obtained by simulation are very consistent with the theoretical calculation results, that is, the polarization manner of the antenna has not been changed, but only a frequency offset occurs in the minimum axial ratio.

Such antennas have a large application value. Firstly, this antenna does not rely on a symmetrical antenna structure, and can make full use of the headroom of a wearable device to reserve a space for other antennas, which is conducive to multi-antenna integration. Secondly, a self-phase shift generated by the antenna is generated by a coupling structure rather than the degenerate mode separation. A phase response is more stable. The polarization manner of the antenna will not be changed due to the machining error and external interference, which is conducive to improving the consistency of a product and the performance stability in complex environments. Finally, the antenna has a simple feed structure, without an additional power divider and phase shifter. The machining of the antenna can be achieved on the basis of an existing process, which has the advantage of low cost.

A second aspect of an embodiment of the present application provides a wearable device, including a circuit board and the above single-frequency circular polarization positioning antenna. The feed end 112 of the inverted F antenna 11 is connected to a first radio frequency port of the circuit board, and the first ground end 113 of the inverted F antenna 11 is connected to a ground port of the circuit board. Further, the second ground end 122 and the third ground end 123 of the parasitic antenna 12 are also connected to the ground port of the circuit board.

The above-mentioned wearable device adopts all the embodiments of the above single-frequency circular polarization positioning antenna, so the wearable device has at least all the beneficial effects of the above embodiments, and will not be repeated here. The positioning antenna of the wearable device can better receive the signals of the navigation satellite, and the right hand circular polarization radiation generated can also filter the left hand circular polarization navigation satellite signals reflected by high buildings or the ground, so as to reduce the multipath interference, thus effectively improving the positioning accuracy of the positioning antenna of the wearable device.

The above are only optional embodiments of the present application, and are not intended to limit this application. Although the present application has been described in detail with reference to the foregoing embodiments, it will be understood by those skilled in the art that the technical solutions described in the foregoing embodiments may still be modified, or some of the technical features may be equivalently replaced. These modifications or substitutions do not make essence of corresponding technical solutions depart from the spirit and scope of the technical solutions of the embodiments of the present application.

What is claimed is:

1. A single-frequency circular polarization positioning antenna, comprising:

an inverted F antenna, wherein the inverted F antenna is provided with a first long edge, a feed end and a first ground end; a distance from the feed end to a tail end of the first long edge is shorter or longer than a distance from the first ground end to the tail end of the first long edge; and a parasitic antenna, wherein the parasitic antenna is coupled to the tail end of the first long edge; the parasitic antenna is arranged on one side of the tail end of the first long edge; the inverted F antenna and the parasitic antenna form an angle; wherein the angle ranges from 70° to 110°;

wherein when the inverted F antenna and the parasitic antenna resonate near a working frequency point, electrical signals on the inverted F antenna and the parasitic antenna are equal in amplitude, and a phase difference is 90°.

2. The single-frequency circular polarization positioning antenna according to claim 1, wherein the parasitic antenna is in an inverted F shape; the parasitic antenna is provided with a second long edge, a second ground end and a third ground end; the second ground end is close to the tail end of the first long edge; a tail end of the second long edge is away from the tail end of the first long edge; and a distance from the second ground end to the tail end of the second long edge is longer than a distance from the third ground end to the tail end of the second long edge.

3. The single-frequency circular polarization positioning antenna according to claim 2, wherein equivalent lengths of the first long edge and the second long edge correspond to a working wavelength of the single-frequency circular polarization positioning antenna.

4. The single-frequency circular polarization positioning antenna according to claim 1, wherein the parasitic antenna is in an inverted L shape; the parasitic antenna is provided with a second long edge and a second ground end; the second ground end is close to the tail end of the first long edge; and a tail end of the second long edge is away from the tail end of the first long edge.

5. The single-frequency circular polarization positioning antenna according to claim 1, wherein the parasitic antenna is in a T shape; the parasitic antenna is provided with a second long edge and a second ground end; the second ground end is close to the tail end of the first long edge; and a tail end of the second long edge is away from the tail end of the first long edge.

6. The single-frequency circular polarization positioning antenna according to claim 1, further comprising a substrate, wherein the inverted F antenna and the parasitic antenna are vertically arranged on the substrate.

7. The single-frequency circular polarization positioning antenna according to claim 1, wherein the inverted F antenna and/or the parasitic antenna are loaded with induction devices.

8. The single-frequency circular polarization positioning antenna according to claim 1, wherein the angle ranges from 75° to 105°.

9. The single-frequency circular polarization positioning antenna according to claim 1, wherein a coupling slot is formed between the tail end of the first long edge and the parasitic antenna, and the coupling slot is adjusted to adjust a coupling degree between the inverted F antenna and the parasitic antenna.

10. A wearable device, comprising a circuit board and the single-frequency circular polarization positioning antenna according to claim 1, wherein a feed end of the inverted F antenna is connected to a first radio frequency port of the circuit board; and the first ground end of the inverted F antenna is connected to a ground port of the circuit board.

11. A single-frequency circular polarization positioning antenna, comprising:

an inverted F antenna, wherein the inverted F antenna is provided with a first long edge, a feed end and a first ground end; a distance from the feed end to a tail end of the first long edge is shorter or longer than a distance from the first ground end to the tail end of the first long edge; and a parasitic antenna, wherein the parasitic antenna is provided with a second long edge; a tail end of the second long edge is spaced apart from and coupled with the tail end of the first long edge; the parasitic antenna is arranged on one side of the tail end of the first long edge; the inverted F antenna and the parasitic antenna form an angle; wherein the angle ranges from 70° to 110°;

wherein when electrical signals respectively loaded to the inverted F antenna and the parasitic antenna satisfy that the amplitudes are equal and a phase difference is 90°, circular polarization radiation is generated.

12. The single-frequency circular polarization positioning antenna according to claim 11, wherein a length of the first long edge and a length of the second long edge is adjusted to adjust a frequency offset occurring at a minimum axial ratio of the circular polarization radiation.

13. The single-frequency circular polarization positioning antenna according to claim 11, wherein the parasitic antenna is an inverted L shape or a T shape; the parasitic antenna further comprises a second ground end; and a distance from the second ground end to the tail end of the second long edge is longer than or shorter than a distance from the second ground end to a start end of the second long edge.

14. The single-frequency circular polarization positioning antenna according to claim 11, wherein equivalent lengths of the first long edge and the second long edge correspond to a working wavelength of the single-frequency circular polarization positioning antenna.

15. The single-frequency circular polarization positioning antenna according to claim 11, further comprising a base plate, wherein the inverted F antenna and the parasitic antenna are vertically arranged on the base plate.

16. The single-frequency circular polarization positioning antenna according to claim 11, wherein the angle ranges from 75° to 105°.

17. The single-frequency circular polarization positioning antenna according to claim 11, wherein a coupling slot is formed between the tail end of the first long edge and the second long edge, and the coupling slot is adjusted to adjust a coupling degree between the inverted F antenna and the parasitic antenna.

* * * * *